June 11, 1929.  C. J. ODEND'HAL  1,716,832

CONSTANT PRESSURE VALVE

Filed July 14, 1927

Inventor:
Charles J. Odend'hal,
John M. Mason
Att'y.

Patented June 11, 1929.

1,716,832

UNITED STATES PATENT OFFICE.

CHARLES JOSEPH ODEND'HAL, OF WASHINGTON, DISTRICT OF COLUMBIA.

CONSTANT-PRESSURE VALVE.

Application filed July 14, 1927. Serial No. 205,691.

This invention relates to a valve and an object of the invention is to provide a valve which operates to maintain a constant pressure in a conduit.

Another object of the invention is to provide a constant pressure valve which may be adjusted to maintain under all conditions of service any desired pressure in a conduit.

Another object of the invention is to provide a constant pressure valve which may be adjusted to a designed pressure which is adapted to be applied to the exhaust steam belt of a marine power plant, the same being constructed and adapted to operate successfully under all conditions of service aboard ship.

Another object of the invention is to provide a valve having a shifting fulcrum and means whereby said fulcrum may be automatically shifted as the pressure is raised or lowered under the valve head, whereby a constant pressure will be maintained at all times in a conduit.

Another object of the invention is to provide a valve which is adapted to operate successfully in a conduit wherein a gas or a liquid is confined or both.

Other objects will appear hereinafter throughout the specification.

Referring to the drawings—

Figure 1:
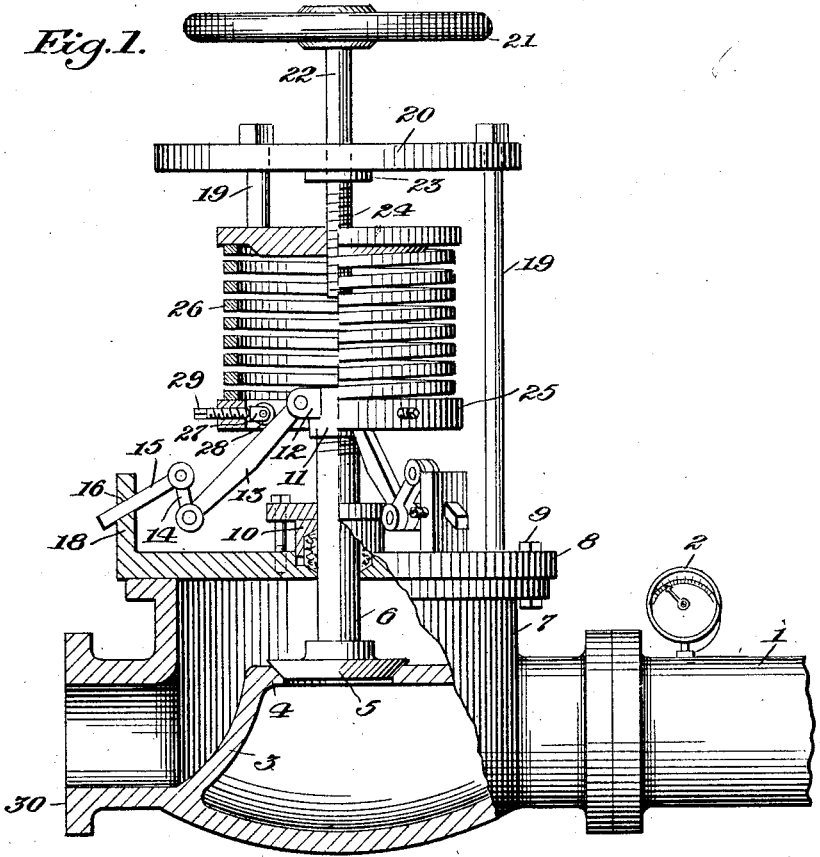
Figure 1 is an elevation, partly in vertical section of one form of my improvements with the valve shown in closed position.

The numeral 1 indicates the pressure side of a conduit, preferably the auxiliary exhaust steam belt of a marine steam power plant, although it is to be expressly understood that the conduit 1 may be connected to any suitable source of pressure, where it could be used and wherein there is to be maintained a constant pressure.

The numeral 2 indicates a suitable gauge for indicating the pressure in conduit 1. The conduit 1 has a partition 3 having a valve seat 4. Cooperating with the valve seat 4 is a valve 5 having a stem 6. A casing 7 is provided which has a cover 8, suitably secured to the casing by bolts 9 or the like.

The stem 6 extends up through the cover 8, and through a stuffing box 10 and has secured on the end thereof, a cap 11 having a plurality of ears, preferably 3 in number, although a greater or less number might be employed. Pivotally attached to each ear 12 so as to swing in a plane radial of stem 6 is a pressure-link 13, the other or fulcrum end of which is pivoted to a fulcrum link 14 the swinging end of which provides a fulcrum-point corresponding to pivotal center 14ᵃ. Fulcrum-link 14 in turn is pivotally attached to an attaching and supporting member 15, which is slidably and adjustably held in a slot 16 of an upstanding stud 18, supported on the cover 8.

The screw nuts 17 hold the supporting members 15 at adjusted positions in the slots 16.

Mounted on the cover 8 are a suitable number of rods 19 or other supports, for supporting plate 20 which is held in a fixed position by the supporting rods 19.

Mounted on a stem 22 is a handwheel 21. The plate 20 has an aperture through which the stem 22 extends, the same having a collar 23 to prevent the stem moving up through the plate.

Below the collar, the stem is threaded, and screws into a threaded aperture of the upper housing and abutment member 24. This member cooperates with a lower annular housing and abutment member 25 to house the compression spring 26 and to sustain the expansive pressure of said spring.

Figure 2:
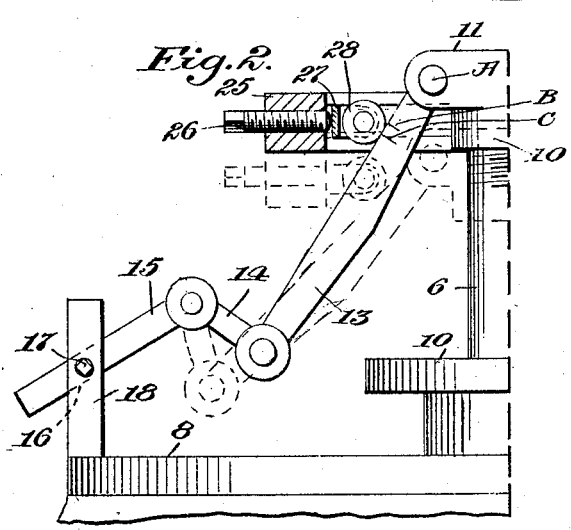
Figure 2 is an elevation, partly in section of parts of the valve shown in Figure 1, the parts assuming the position when the valve is open or partially open, the closed position of the parts being shown in dotted lines.

Mounted in suitable guides provided on the lower spring housing are bearings 27, of a number equal to the number of links 13, and mounted in the bearings are antifriction means such as rollers 28 as shown in Figures 1 and 2. Rollers 28 ride on the links 13 and thus support the lower housing 25 and transmit pressure from the spring 26 to links 13 and by them to the valve by way of ears 12, cap 11 and stem 6. Each roller 28 is movable to various adjusted positions on the links 13 by suitable adjusting means such as screw 29.

The numeral 30 indicates the exhaust side of the conduit 1.

It will be seen that by turning handwheel 21 the opening pressure of valve 5 may be set and any desired pressure can be maintained in the conduit 1 at all times.

Steam, oil or water, or other liquids or gases enter the conduit 1 from any suitable source of pressure. When the pressure rises above the amount for which valve 5 has been set, the valve rises, forcing the stem upward and carrying the links 13 also upward. As the links 13 rise with the valve stem, they slide under the rollers 28, which roll thereon, and the upward pressure of the valve is transmitted to the spring 26 through the rollers 28 and lower housing 25. It will be seen that link 13 is a lever with its fulcrum at 14ᵃ and with the point of application of the valve-lifting pressure at A (Fig. 2). It will be clear that as the valve stem shifts vertically the point of application to lever 13, through roller 28, of the pressure of spring 26 shifts so as to shorten the length of 13 between the point of application and fulcrum-point 14ᵃ when the stem rises, and lengthen it when the stem descends. These changes, because of the simple harmonic relation of movements at 14ᵃ, which travels in the arc of a circle, to movements of the point of contact, which are in a straight line, are such that effective resistance of the spring to upward movements of the valve is kept substantially uniform as set when adjustment of the opening pressure of the valve by turning members 21 and 29 is made.

By proper adjustment of the links 15 relative to studs 18 or adjustment of rollers 28 by means of screws 29, the pressure tending to keep the valve shut, which is exerted by spring 26, can be made constant, no matter how much steam, water, gas or oil passes through the conduit 1 to the exhaust 30. For example, if it be desired to maintain 10 pounds pressure in the conduit 1, hand wheel 21 is turned to compress the spring 26 until the gauge 2 reads 10 pounds. Any increase of pressure above 10 pounds in the conduit 1 caused by liquids or gases in said conduit will tend to lift the valve 3. As the valve lifts, the spring 26 is compressed and the pressure exerted downwardly by the spring is progressively increased as the spring is compressed. This increase of pressure however is compensated for as follows: As the links 13 move upward, the rollers 28 shift to shorten the distance from the point of application of the spring pressure to fulcrum-point 14ᵃ to a degree that compensates for the increased tension of the spring due to its compression. By adjustment of links 15 and rollers 28, the lift of the spring 26 can be adjusted so that a balance will be maintained, whereby the pressure of 10 pounds will be kept constant in the conduit 1.

Figure 3:
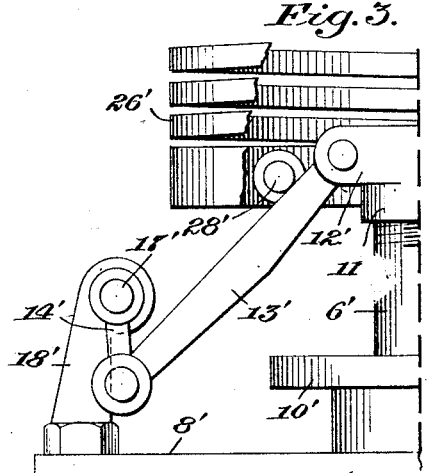
Figure 3 is an elevation partially in section of a modified form of my improvements.

The structure shown in Figure 3 is similar to that shown in Figures 1 and 2 except that no adjustable link 15 is provided nor are the rollers 28 adjustable in the housing member 25. The number 8′ indicates the valve housing cover, 6′ the valve stem, 11′ the valve stem cap, 12′ the ears attached to said cap, 10′ the stuffing box, 13′ the links, 28′ the rollers rolling on said links and attached to the lower housing member, 26′ the spring, 14′ the links pivoted to links 13′ and to the stud members 18′ at 17′. The operation is similar to the device shown in Figures 1 and 2 except that the adjustment of the rollers and links is not provided for.

This construction is adapted for operating conditions where more accurate adjustment is not required.

My improved valve as shown in Figures 1, 2 and 3 is adapted for installation to maintain constant pressure in exhaust steam lines, lubricating oil lines, feed water lines, fuel oil lines etc.

It is expressly understood that the drawing and description forming this application are given for illustrative purposes only, and that I desire to be limited in the application of my invention only to the extent as set forth in the appended claims.

Claims:

1. In combination, a valve, an elastic means, and a bodily-movable member engaging said valve and engaging said elastic means at different positions along the length of the bodily movable member and maintaining in all positions of said valve a substantially uniform tendency of said elastic means to close said valve.

2. In combination, a valve, an elastic means, and a member movable bodily with said valve and slidably engaging said elastic means and maintaining in all positions of said valve a substantially constant tendency of said elastic means to close said valve.

3. In combination, a conduit, a valve reciprocable therein and having a stem projecting through the wall thereof, an elastic member having a fixed support and a tension play in a straight line, and a member slidably engaging said elastic member and directly engaging said valve stem and having substantially unidirectional movements with said stem, whereby during movement of said stem along its axis said member will transmit from said elastic member to said valve a substantially constant effective pressure.

4. In combination, a conduit, a valve reciprocable therein, a fulcrum-link pivoted at one end to said conduit and supporting a fulcrum at its other end, a pressure-link pivoted at one end to said fulcrum and at the other end to the stem of said valve, and an elastic means slidably engaging said pressure-link so as to maintain substantially uniform in all positions of said valve the effective valve-controlling pressure transmitted by said pressure-link from said elastic means to said valve.

5. In combination, a helical spring, a stationary member engaging one end of said spring, a movable member engaging the other end of said spring, a reciprocable valve stem disposed substantially parallel to the axis of said spring, and a member so engaging said valve stem and said movable member that during travel of said stem along its axis said member will transmit from said spring to said stem a substantially constant effective valve-controlling pressure.

6. In combination, a conduit, a reciprocable valve in said conduit having a stem projecting through a wall of said conduit, a fulcrum-link pivotally supported at one end by said conduit, a pressure-link pivoted at one end to said stem and at the other end to said fulcrum-link, and an elastic means having an end fixed to said conduit and directly engaging said pressure-link in all positions of said pressure-link due to movements of said stem, whereby the effective pressure transmitted from said elastic means to said valve through said pressure-link will remain substantially constant.

7. In combination, a conduit, a reciprocable valve in said conduit and having a stem projecting through a wall thereof, a fulcrum-link pivoted at one end to said conduit and supporting a fulcrum at its other end, a pressure-link pivoted at one end to said fulcrum and at the other end to said stem, a member supported by said conduit, an elastic means engaging said member and slidably engaging said pressure-link so as to maintain a substantially constant resistance to opening movements of said valve, and means for adjusting said member to regulate the effective resistance of said elastic means to opening movements of said valve.

8. In combination, a conduit, a reciprocable valve in said conduit having a stem projecting through a wall thereof, a fulcrum-link pivoted at one end to said conduit to shift in a plane radial of said stem, a pressure-link pivoted at one end to said fulcrum-link and at the other end to said stem, and elastic means slidably engaging said pressure-link so that as said stem travels along its axis said fulcrum-link will automatically shift to maintain substantially constant the moment of resistance of said elastic means to valve-opening stresses.

9. In combination, a conduit, a reciprocable valve in said conduit having a stem projecting through a wall thereof, a fulcrum mounted on said conduit to swing in a plane radial of said stem, a link pivoted to said fulcrum and to said stem, and elastic means so engaging said link that as said stem travels along its axis said fulcrum will swing in the arc of a circle, and said point of engagement of said elastic means with said link will shift along a straight line so as to preserve substantially constant at all points of travel of said stem along its axis the moment of resistance of said elastic means to the opening of said valve.

10. In combination, a conduit, a reciprocable valve therein having a stem projecting through a wall thereof, an abutment, an abutment support on said conduit, means on said abutment support for adjusting and holding said abutment fixed at different distances from said abutment support, a fulcrum-link support on said conduit, a fulcrum-link pivoted to said fulcrum-link support to swing in a plane radial of said stem, means operable to fasten said fulcrum-link support in adjusted positions relatively to said stem, a pressure-link pivoted at one end to said fulcrum-link and at the other end to said stem, an elastic means engaging said fixed abutment, a movable abutment engaged by said elastic means and having means adjustable relatively to said movable abutment for shiftably engaging said pressure-link, and means for adjusting said shiftable engaging means.

In testimony whereof I have hereunto set my hand this day of July 1 A. D. 1927.

CHARLES J. ODEND'HAL.